(12) United States Patent
Takase et al.

(10) Patent No.: US 6,313,849 B1
(45) Date of Patent: Nov. 6, 2001

(54) MODAL CONTROL SCROLLING OF DISPLAY AREA

(75) Inventors: Harumi Takase; Tsuyoshi Ogura, both of Fukushima-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 0 days.

(21) Appl. No.: 09/345,721

(22) Filed: Jun. 30, 1999

(30) Foreign Application Priority Data

Jul. 6, 1998 (JP) .................................................. 10-190273

(51) Int. Cl.[7] ...................................................... G09G 5/34
(52) U.S. Cl. ................................................................ 345/684
(58) Field of Search ................................... 345/123–125, 345/684, 685, 784, 785, 786, 835, 973

(56) References Cited

U.S. PATENT DOCUMENTS

| 4,868,785 | * | 9/1989 | Jordan et al. | 365/900 |
| 5,633,657 | * | 5/1997 | Falcon | 345/145 |
| 5,659,333 | * | 8/1997 | Okishima | 345/123 |
| 5,956,031 | * | 9/1999 | Berteig et al. | 345/339 |

* cited by examiner

Primary Examiner—Almis R. Jankus
Assistant Examiner—G. F. Cunningham
(74) Attorney, Agent, or Firm—Brinks Hofer Gilson & Lione

(57) ABSTRACT

A scrollable mode is caused to enter, in which scrolling using a pointing device can be performed by depressing a specified key in the keyboard, and in the scrollable mode, the display area is caused to be scrolled in a direction corresponding to the moving direction of the cursor which is operated by the pointing device.

4 Claims, 4 Drawing Sheets

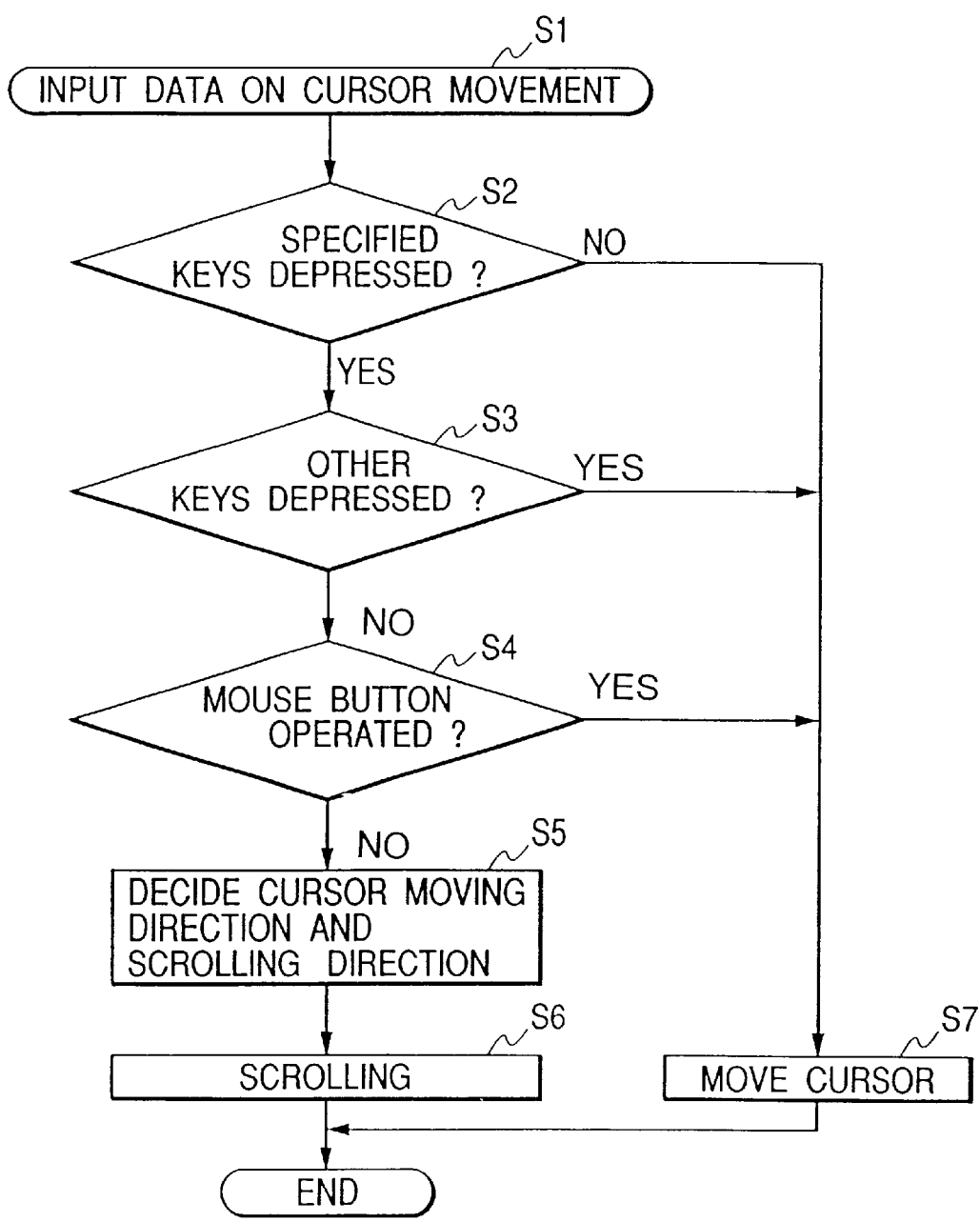

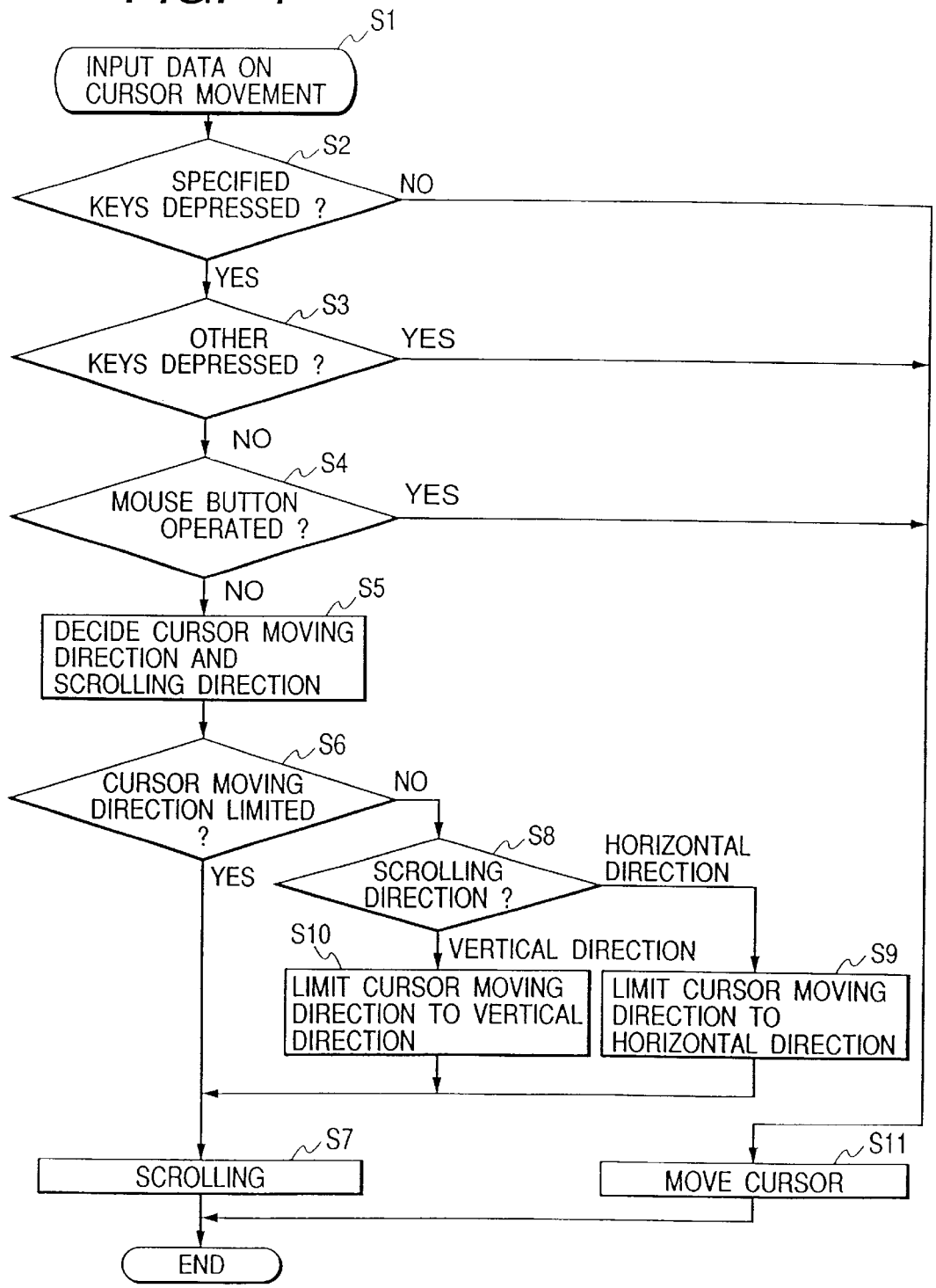

MODAL CONTROL SCROLLING OF DISPLAY AREA

BACKGROUND OF THE INVENTION

1. Field of the Invention

The present invention relates to a display area scrolling method capable of two-dimensionally scrolling (moving) a display area displayed on a window.

2. Related Art

In a conventional window system (FIG. 6), when a display object becomes larger than the display area on a window, the display area is displayed on a window having scroll bars for moving the display area.

In order to display, within the display range 22, a display object portion 23 located outside of the display range 22 of the window 21 as shown in, for example, FIG. 6, the display object portion 23 was moved within the display range 22 by dragging a scroll bar 25 or 26 using a pointing device, for example, a cursor 24 of a mouse to scroll the display area, or the display object portion 23 was dragged using a mouse equipped with a special-purpose mechanism for scrolling to move the display area.

Of the conventional scrolling methods, however, the former method is capable of dragging only either a vertical bar 25 or a horizontal bar 26 of the scroll bars, and therefore, the display area could not be moved in any arbitrary direction other than the vertical direction or the horizontal direction by one operation. Also, in order to perform an operation within the display range 22 after moving the display area, it was necessary to move the mouse cursor 24 which has been located at the scroll bar 25 or 26, to a predetermined position within the display range 22.

In the latter method, it is necessary to use a mouse having a special-purpose mechanism for scrolling, and the mouse cursor 26 also moves with the movement of the display area.

More specifically, according to the conventional scrolling method, a desired display object portion 23 appears within the display range 22, and the mouse cursor 24 is at a position apart from the display object portion 23 at the termination of the movement of the display area, and in order to perform an operation by designating the display object portion 23, the mouse cursor 24 had to be moved again.

SUMMARY OF THE INVENTION

A display area scrolling method according to the present invention is to move the display object portion within the display range by moving the display area in an arbitrary direction by one operation without the aid of any special mouse or the like, and to render the display object portion capable of being designated immediately after the movement.

As means for solving the above-described problems, a display area scrolling method according to the present invention is to cause a scrollable mode to enter in which scrolling using a pointing device can be performed by depressing a specified key in the keyboard, and to scroll, in the scrollable mode, the display area in a direction corresponding to the moving direction of a cursor which is operated by the pointing device.

A display area scrolling method according to the present invention is to cause the movement of the cursor to be stopped in a state in which the display area is being scrolled.

Also, a display area scrolling method according to the present invention is to cause, when the cursor is going to be moved in a next direction again from its stopped state, the display area to be scrolled in a direction corresponding to the next moving direction.

Also, a display area scrolling method according to the present invention is to render the display area capable of being scrolled only in a direction in which a pointer operated by the pointing device moved first and in a direction opposite thereto in the scrollable mode.

Also, a display area scrolling method according to the present invention is to cause the scrollable mode to be released by any of the following operations:

(1) when the depression of the specified key is suspended.
(2) when any key other than the scroll key in the keyboard is depressed.
(3) when the button of the pointing device is depressed.

BRIEF DESCRIPTION OF THE DRAWINGS

FIG. 2 is a flow-chart in which a display area scrolling method according to the present invention is executed;

FIG. 4 is a flow-chart in which another display area scrolling method according to the present invention is executed;

DETAILED DESCRIPTION OF PREFERRED EMBODIMENT

Figure 1:
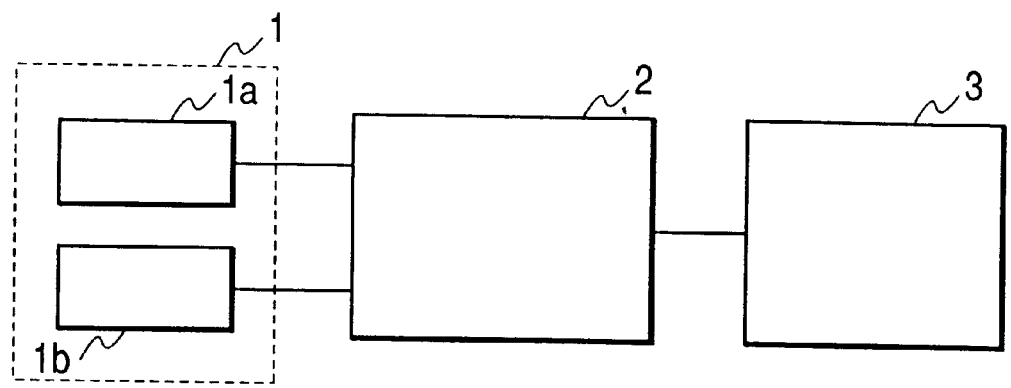
FIG. 1 is a structural view showing a window system to which a display area scrolling method according to the present invention is applied.

Hereinafter, with reference to FIGS. 1 to 5, the description will be made of a display area scrolling method according to the present invention. FIG. 1 is a block diagram showing the structure of a window system to which a display area scrolling method according to the present invention is applied.

In FIG. 1, the window system is composed of: an input unit 1 including, for example, a mouse 1a, which is a pointing device, and a keyboard 1b for inputting various types of information; an information processing unit 2 for controlling the entire window system; and a display unit 3 for displaying various types of information.

FIG. 2 is a flow-chart showing operating procedures for a display area scrolling method according to the present invention (hereinafter, referred to as a scrolling method according to the present invention), and this operation is executed in accordance with a program incorporated in the information processing unit 2.

According to the present invention, in a step (Step S1) in which the mouse 1a, which is a pointing device, first moves, and data on the movement of the mouse cursor is inputted in the information processing unit 2, a scrollable mode, in which a scrolling method according to the present invention becomes executable, enters (Step S2) by depressing a specified key in the keys in the keyboard 1b. When with this specified key depressed, the other keys are not depressed (Step S3), or the mouse button is not operated (Step 4), the scrollable mode is continuing. Therefore, if any of the other keys is depressed in the Step S3, or if the mouse button is operated in the Step S4, the scrollable mode will be released.

Figure 3:
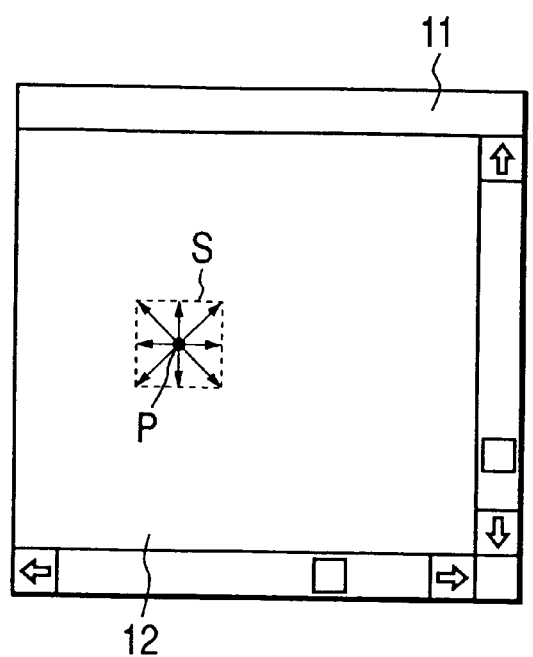
FIG. 3 is an explanatory view when a display area scrolling method according to the present invention is executed.

When the mouse cursor is moved within the display range 12 of a window 11, which becomes the object, scrolling is performed. When the mouse cursor is located at an origin P within the display range 12 of the window 11 as shown in FIG. 3, the movement of the mouse cursor is arranged to be limited within the area of a square S with the origin P as the center. In a step S5, in the process of the movement within this area, the information processing unit 2 analyzes a moving direction of the mouse cursor to determine, on the basis of the analysis results, in which direction of eight directions: vertical directions (up and down), horizontal directions (left and right) and oblique directions (upper right, lower right, upper left and lower left) the mouse cursor is approximately moving. On the basis of this determination, a scrolling direction of the display area of the window is determined (the scrolling direction becomes opposite to the moving direction of the mouse cursor determined). Thus, when scrolling is started (Step S6), the mouse cursor stops on the demarcation line of the square S with the origin P as the center, and only the display area is scrolled.

When the mouse cursor is further moved in another direction while this scrolling is being continued, a moving direction is determined again with a point, where the mouse cursor has stopped up to that time, as a new origin, and scrolling in a new display area is started. Therefore, by repeating this operation, the display area can be scrolled in an arbitrary direction only by the mouse cursor.

In this respect, if another key is depressed in the step S3 or if the mouse button is depressed in the step S4, the scrollable mode will be released, but in this case, the mouse cursor will be able to move as usual (Step S7). Also, if the depressed specified key for setting to the scrollable mode is released, the scrollable mode will be released.

According to the scrolling method described above, when even if scrolling is once started, the mouse cursor is moved in another direction thereafter, scrolling is performed again in accordance with the moving direction. Therefore, the scrolling direction is changed midway by a shake or the like of the mouse. However, there are also cases where after scrolling is once performed, its scrolling direction should not be changed. A scrolling method in such cases is executed by operating in accordance with the flow-chart shown in FIG. 4. This operation is also performed in accordance with a program incorporated in the information processing unit 2.

In FIG. 4, the operations in the steps S1 to S4 are the same as in the flow-chart shown in FIG. 2. More specifically, in a step (Step S1) in which the mouse 1a, which is a pointing device, first moves and data on the movement of the mouse cursor is inputted in the information processing unit 2, a scrollable mode, in which a scrolling method according to the present invention becomes executable, enters (Step S2) by depressing the specified key in the keys in the keyboard 1b. When with this specified key depressed, the other keys are not depressed (Step S3) or the mouse button is not operated (Step 4), the scrollable mode is continuing. Therefore, if any of the other keys is depressed in the Step S3, or if the mouse button is operated in the step S4, the scrollable mode will be released.

When the mouse cursor is moved within the display range 12 of a window 11, which becomes the object, scrolling is performed. When the mouse cursor is located at an origin P within the display range 12 of the window 11 as shown in FIG. 3, the movement of the mouse cursor is arranged to be limited within the area of a square S with the origin P as the center. In a step S5, in the process of the movement within this area, the information processing unit 2 analyzes a moving direction of the mouse cursor to determine, on the basis of the analysis results, in which direction of four directions: vertical direction (up and down), and horizontal direction (left and right) the mouse cursor is approximately moving (there are no four oblique directions). Next, in a step S6, it is determined whether or not the display area scrolling direction has been already limited to the horizontal direction or the vertical direction.

If the display area scrolling direction has been already limited to the horizontal direction or vertical direction, scrolling will be executed on the basis of the determination in the step S5 (Step S7).

On the other hand, if the display area scrolling direction has not been limited to the horizontal direction or vertical direction in the step S6, it will be determined whether the display area scrolling direction is horizontal or vertical (Step S8). If the scrolling direction is horizontal, the moving range of the mouse cursor will be limited to the horizontal direction (Step S9) to execute scrolling (Step S7), and if the scrolling direction is vertical, the moving range of the mouse cursor will be limited to the vertical direction (Step S10) to execute scrolling (Step S7).

This limitation makes it impossible to move the mouse cursor in any oblique directions, and therefore, the display area scrolling direction is also fixed only to the horizontal direction or the vertical direction. For this reason, the scrolling direction is not changed even if there may be a shake in the mouse during the scrolling.

Figure 5:
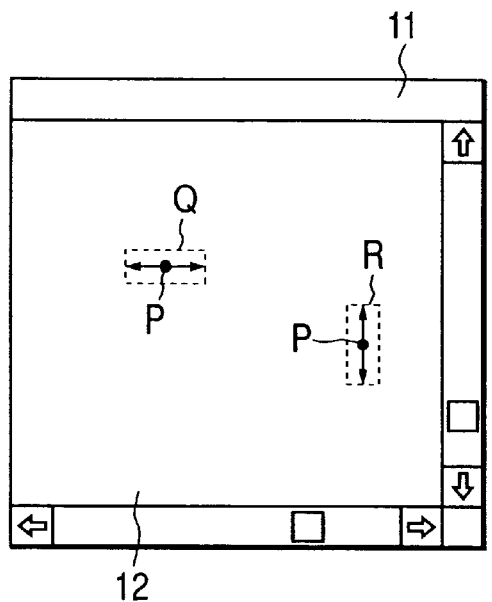
FIG. 5 is an explanatory view when a display area scrolling method according to the present invention is executed.
Figure 6:
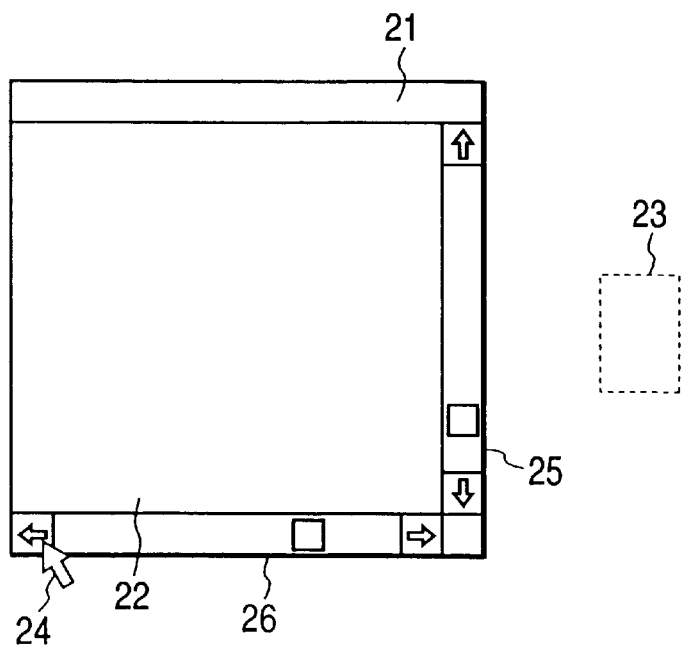
FIG. 6 is an explanatory view when a display area scrolling method according to the related art is executed.

In this respect, in the step S9 or the step S10, the moving range of the mouse cursor is limited and as a result, the moving range of the mouse cursor from the origin P does not become a square S, but a range of a rectangle having longer horizontal sides Q or a rectangle having longer vertical sides R as shown in FIG. 5. In this respect, two rectangles Q and R are shown together in FIG. 5 for the sake of convenience.

In this respect, when another key is depressed in the step S3 or when the mouse button is depressed in the step S4, the scrollable mode is released, but in this case, the mouse cursor can move as usual (Step S11). Also, when a depressed specified key for setting to a scrollable mode is released, the scrollable mode is released.

As described above, a display area scrolling method according to the present invention is to cause the scrollable mode to enter in which scrolling using a pointing device can be performed by depressing a specified key in the keyboard, and to cause, in the scrollable mode, the display area to be scrolled in a direction corresponding to the moving direction of the cursor to be operated by the pointing device. Therefore, it is possible to move the display area in any of eight directions vertical directions, horizontal directions and oblique directions by one operation without the aid of any special mouse or the like.

Also, a display area scrolling method according to the present invention is to cause the movement of the cursor to be stopped in a state in which the display area is being scrolled, and therefore, a display object within the display range can be designated by the cursor immediately at the termination of the scroll of the display area.

Also, a display area scrolling method according to the present invention is to cause, when the cursor is going to be moved in a next direction again from its stopped state, the display area to be scrolled in a direction corresponding to the next moving direction, and therefore, the display area can be scrolled in an arbitrary direction by continuing the movement of the cursor.

Also, a display area scrolling method according to the present invention is to render the display area capable of being scrolled only in a direction, in which the pointer operated by the pointing device first moved, and in a direction opposite thereto in the scrollable mode. Therefore, the scrolling direction cannot be changed by a shake or the like on operating the pointing device.

Also, in a display area scrolling method according to the present invention, the scrollable mode has been arranged to be released by any of the following operations:

(1) The depression of a specified key is suspended.
(2) Any key other than the specified key in the keyboard is depressed.
(3) The button of the pointing device is depressed.

Therefore, the scrollable mode can be easily released.

What is claimed is:

1. A display area scrolling method comprising:

detecting input data from a pointing device;

moving a cursor operated by the pointing device in a moving direction on a display area in response to the input data;

determining whether a specified key in a keyboard is depressed;

entering a scrollable mode when the specified key is depressed; and when in the scrollable mode:
  scrolling through the display area in the moving direction;
  limiting movement of the cursor from a starting location by stopping the movement of the cursor within a predetermined distance from the starting location;
  resetting the starting location to a location in which the cursor has been stopped when the cursor is moved in a new moving direction; and
  scrolling the display area in the new moving direction.

2. A display area scrolling method comprising:

detecting input data from a pointing device;

moving a cursor operated by the pointing device in a moving direction on a display area in response to the input data;

determining whether a specified key in a keyboard is depressed; and entering a scrollable mode when the specified key is depressed;

when in said scrollable mode:
  scrolling through the display area in the moving direction;
  limiting movement of the cursor from a starting location by stopping the movement of the cursor within a predetermined distance from the starting location when in the scrollable mode; and
  limiting a direction in which said display area is scrolled to only a direction in which a pointer operated by said pointing device is first moved and a direction opposite thereto.

3. A display area scrolling method according to claim 1, further comprising exiting said scrollable mode by one of:

(1) suspending depression of said specified key;
(2) depressing any key in said keyboard other than said specified key; and
(3) depressing a button of said pointing device.

4. A display area scrolling method according to claim 2, further comprising exiting said scrollable mode by one of:

(1) suspending depression of said specified key;
(2) depressing any key in said keyboard other than said specified key; and
(3) depressing a button of said pointing device.

* * * * *